United States Patent [19]
Kurita et al.

[11] Patent Number: 5,969,521
[45] Date of Patent: *Oct. 19, 1999

[54] AUTOMATIC MEASURING APPARATUS HAVING A SWITCHING MEANS TO GENERATE AN OUTPUT SIGNAL ONLY WHEN A SENSOR IS POSITIONED AT A PREDETERMINED SPACE

[75] Inventors: Tamotsu Kurita; Manabu Nagai, both of Ayase, Japan

[73] Assignee: Speedfam Co., Ltd., Kanagawa-ken, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/891,720

[22] Filed: Jul. 11, 1997

[30] Foreign Application Priority Data

Jul. 18, 1996 [JP] Japan ................................. 8-206391

[51] Int. Cl.$^6$ .............................. G01B 7/06; G01B 13/06; G01B 13/12
[52] U.S. Cl. ........................ 324/229; 73/159; 271/265.04
[58] Field of Search .................................. 324/229, 230, 324/231, 232, 235, 262, 226; 73/159, 37.7; 271/262, 263, 265.01–265.04; 340/675

[56] References Cited

U.S. PATENT DOCUMENTS

| | | |
|---|---|---|
| 4,019,131 | 4/1977 | Yamada et al. ........................ 324/229 |
| 4,407,094 | 10/1983 | Bennett et al. ............................. 51/165 |
| 4,433,510 | 2/1984 | Katagiri et al. ............................... 451/5 |
| 4,814,703 | 3/1989 | Carr et al. ................................ 324/229 |

FOREIGN PATENT DOCUMENTS

| | | |
|---|---|---|
| 3213252 | 12/1982 | Germany . |
| 48-84991 | 11/1973 | Japan . |
| 56-146666 | 11/1981 | Japan . |
| 57-15668 | 1/1982 | Japan . |
| 57-76406 | 5/1982 | Japan . |
| 58-192747 | 11/1983 | Japan . |
| 3-234468 | 10/1991 | Japan . |

*Primary Examiner*—Jay M. Patidar
*Attorney, Agent, or Firm*—Fitch, Even, Tabin & Flannery

[57] ABSTRACT

An automatic measuring apparatus is capable of measuring the thickness of a work piece with a high degree of precision. Distance data for carriers is removed from distance data representative of the distances between a pair of surface plates which are detected in a non-contact manner. An eddy current sensor mounted on a first surface plate detects a distance therefrom to a second surface plate and generates a corresponding analog voltage signal. When the eddy current sensor enters and exits a space between two adjacent carriers, voltage signals are generated. The voltage signals are processed to determine the voltage value of a digital voltage signal that has a maximum frequency or a maximum number of occurrences among the voltage signals being processed. The resultant determination is used to arrive at the work piece thickness.

7 Claims, 6 Drawing Sheets

PRIOR ART

AUTOMATIC MEASURING APPARATUS HAVING A SWITCHING MEANS TO GENERATE AN OUTPUT SIGNAL ONLY WHEN A SENSOR IS POSITIONED AT A PREDETERMINED SPACE

BACKGROUND OF THE INVENTION

1. Field of the Invention

The present invention relates to an automatic measuring apparatus for measuring the thickness of a workpiece being polished by detecting a change in the distance between a pair of surface plates, and more particularly, it pertains to such an automatic measuring apparatus which is usable with a lapping apparatus.

2. Description of the Related Art

A lapping apparatus is equipped with an first or upper surface plate and a second or lower surface plate which are rotatably supported through arms so that work pieces each held by a carrier is clamped by means of the upper and lower surface plates which are driven to rotate in opposite directions to thereby polish the work pieces.

In general, with such a lapping apparatus, an automatic measuring apparatus is used to automatically determine whether a work piece is ground or polished to a predetermined thickness.

Conventionally, for such a type of automatic measuring apparatus, there has been known one using a magnetic scale. This type of automatic measuring apparatus is constructed such that the magnetic scale has an upwardly directed probe with its top end being placed in contact with a lower surface of a chip which is coupled with the upper surface plate for integral rotation therewith.

Specifically, as the upper surface plate is moved downward in accordance with an increasing amount of polishing of the work piece, the chip is also moved downward together with the upper surface plate, so that the probe is pushed into the magnetic scale. Thus, the magnetic scale detects an amount of displacement of the probe, whereby the distance between the upper and lower surface plates is measured through the displacement amount, determining the thickness of the work piece.

Another type of automatic measuring apparatus has been known which employs an eddy current sensor 102, as illustrated in FIG. 8. In this automatic measuring apparatus, an eddy current sensor 102 mounted on an upper surface plate 3 radiates a magnetic field toward a lower surface plate 2 so that it detects the distance between the upper and lower surface plates 3, 2 and successively outputs an analog voltage signal indicative of the detected distance. An arithmetic operation means 110 converts the analog voltage signal into a predetermined sampling number of corresponding digital voltage signals, and calculates the distance between the upper and lower surface plates 3, 2 based on the voltage value of the greatest number of digital voltage signals among these digital voltage signals, to thereby determine the thickness of the work piece.

More specifically, the eddy current sensor 102 detects carriers 100 and cross grains or marking grooves 20 on an upper surface of the lower surface plate 2, so analog voltage signals sampled by the arithmetic operation means 110 include, in addition to ones indicative of the distance between the upper and lower surface plates 3, 2, those which indicate the distances from the upper surface plate 3 to the carriers 100 and the cross grains 20.

In this case, an object that is the nearest to the lower surface of the upper surface plate 3 is the upper surface of each carrier 100 disposed on the lower surface plate 2, and the second nearest one is the upper surface of the lower surface plate 2 lying between the carriers 100, and the most distant ones are the cross grains or marking grooves 20.

As a result, the voltage indicating the distance of each carrier 100 to the lower surface of the upper surface plate 3 (hereinafter simply referred to as the carrier distance) is of the lowest value, the voltage indicating the distance of the lower surface plate 2 thereto is higher than the voltage indicative of the carrier distance, and the voltage indicating the distance of the cross grains 20 thereto is of the highest value.

Also, since the detection time of the eddy current sensor 102 detecting the upper surface of the lower surface plate 2 is the longest, the number or frequency of generations of the digital voltage signals indicating the lower surface plate 2 is the greatest. Owing to the fact that the detection time with respect of the upper surfaces of the carriers 100 is less than the detection time for the lower surface plate 2, the frequency of the digital voltage signals indicative of the distances from the lower surface of the upper surface plate 3 to the upper surfaces of the carriers 100 is less the frequency of the digital voltage signals indicative of the distances from the upper surface of the lower surface plate 2 to the lower surface of the upper surface plate 3. Similarly, the detection time for the cross grains 20 is the shortest and hence the frequency relating to this is the lowest.

As a consequence, there is obtained a distribution of frequencies as shown in FIG. 9. As clearly seen from this figure, frequencies C for the carrier 100 appear in a low-voltage side or range; frequencies U for the lower surface plate 2 appear in an intermediate-voltage range, and frequencies S for the cross grains 20 appear in a high-voltage side or range which is slightly higher in voltage than the intermediate-voltage range.

Thus, the arithmetic operation means 110 takes out a voltage value having the greatest frequency of the frequency curve U, and performs a reverse calculation based on this voltage value so as to obtain the distance between the lower and upper surface plates 2, 3, and determines the calculated distance as the thickness of the work piece.

The above-mentioned conventional automatic measuring apparatus have, however, involved the following problems.

First, with the automatic measuring apparatus using the magnetic scale, since it is constructed such that it presumes a quantity of downward displacement of the upper surface plate from a predetermined reference position as an amount of polishing of the work piece being polished, wearing of the lower surface plate results in an error in the measured values.

That is, as the lower surface plate is being worn, the quantity of downward displacement of the upper surface plate, which is equal to the sum of the quantity of wear of the work piece and that of the lower surface plate, can not correspond exactly to the thickness of the work piece. Therefore, when the lower surface plate has been worn to a substantial extent, it becomes impossible to measure the thickness of the work piece in a precise manner.

Furthermore, due to the construction that the probe is placed in contact with the chip integrally rotating with the upper surface plate, the contacting end of the probe is worn by rotation of the chip, thus giving rise to a possible error in measurements.

In contrast to this, with the automatic measuring apparatus employing the eddy current sensor 102, since it is constructed such that the distance between the upper and lower surface plates is detected by using a magnetic field projected to the lower surface plate 2 from the eddy current sensor 102 mounted on the upper surface plate 3, there will be no error due to wear on the lower surface plate 2 and/or the probe.

In this type of automatic measuring apparatus, however, the arithmetic calculation means 110 calculates a voltage value of the greatest number of occurrences or the greatest frequency based on the distribution of the number of occurrences or frequencies as shown in FIG. 9, and then converts it into a corresponding value of thickness of the work piece. With such a construction, there may be a large error in the measurements depending upon the property of the work piece.

Specifically, the work piece is fitted into a corresponding bore in the carrier 100 so that it passes under the eddy current sensor 102. In the event that the work piece is formed of a material having a high resistance, the eddy current sensor 102 can not detect the work piece but instead the upper surface of the lower surface plate 2 disposed under the work piece. In this regard, the frequency curve U as shown in FIG. 9 is the sum of the frequency a of the upper surface of the lower surface plate 2 exposed between the plurality of carriers 100 and the frequency b of the upper surface of the lower surface plate 2 disposed under the work piece, and hence the maximum value of the sum a+b is substantially great in comparison with the maximum value of the frequency curve C. Accordingly, it will be no case in which the frequency curves C and U are distinguished or recognized by mistake.

If the work piece is formed of a material having a low resistance, however, the eddy current sensor 102 can detect the work piece and output an analog voltage signal corresponding to the resistance value.

Thus, the frequency curve of the work piece appears in the vicinity of the frequency curve C, and the maximum frequency of the frequency curve U decreases to the value "a", so that there arises a situation that the maximum values of the frequency curves U, C and the frequency curve of the work piece become substantially similar to each other.

In this situation where the maximum values for the plurality of frequency curves become substantially the same value, the voltage value corresponding to the maximum frequency of the frequency curve U is mistakenly calculated as the voltage value corresponding to the maximum frequency of the frequency curve C, resulting in an incorrect measurement of the thickness of the work piece.

SUMMARY OF THE INVENTION

The present invention is intended to obviate the above-mentioned various problems encountered with the conventional automatic measuring apparatuses, and has for its object to provide a novel and improved automatic measuring apparatus which is capable of performing a highly accurate measurement of the thickness of a work piece without being affected by the property of the work piece by excluding distance data relating to carriers from distance data representative of the distances between a pair of surface plates which are detected in a non-contact state.

In order to solve the aforementioned problems, according to the present invention, there is provided an automatic measuring apparatus comprising:

distance sensor means mounted on one of a pair of surface plates which are rotatable with respect to each other with a plurality of carriers each holding a work piece being sandwiched therebetween for radiating an electromagnetic wave toward the other surface plate to thereby detect a distance thereto and for generating an analog signal representative of the thus detected distance;

analog/digital conversion means for converting the analog signal from the distance sensor means into a corresponding digital voltage signal at a predetermined sampling frequency;

switching means for allowing the digital voltage signals from the analog/digital conversion means to pass only when the distance sensor means is positioned at a space between the carriers; and arithmetic operation means for determining a thickness of each work based on a voltage value of a digital voltage signal having a maximum frequency among the digital voltage signals from the switching means.

With the above arrangement, the pair of surface plates rotate with the plurality of carriers holding work pieces being sandwiched therebetween, so that the work pieces are thereby polished. At this time, the distance sensor means mounted on the one surface plate radiates an electromagnetic wave so as to detect the distance to the other surface plate, and generates an analog voltage signal representative of the detected distance value. The analog voltage signal from the distance sensor means is converted into a digital voltage signal by the analog/digital conversion means at the predetermined sampling frequency. The digital voltage signal thus converted is allowed to pass the switching means only when the distance sensor means is positioned at the space between the carriers. As a result, only a digital voltage signal representing the distance to the other surface plate disposed in the space is input to the arithmetic operation means where the thickness of each work piece is calculated from the voltage value of the digital voltage signal having a maximum frequency.

In one form of the invention, the switching means comprises:

a first carrier sensor mounted on the one surface plate in which the distance sensor means is mounted for detecting one of two adjacent carriers positioned on the opposite sides of the space to generate a first high-level voltage signal when the distance sensor means is positioned at the space;

a second carrier sensor mounted on the one surface plate in which the distance sensor means is mounted for detecting the other of the two adjacent carriers to generate a second high-level voltage signal when the distance sensor means is positioned out of the space; and a gate circuit connected to an output terminal of the analog/digital conversion means and adapted to open upon rising of the first voltage signal and close upon rising of the second voltage signal.

With the above arrangement, when the distance sensor means is positioned at the space, the first carrier sensor of the switching means detects one of the two carriers disposed on the opposite sides of the space and generates a first high-level voltage signal to the gate circuit. The gate circuit opens upon rising of the first voltage signal, allowing the digital voltage signal from the analog/digital conversion means to pass to the arithmetic operation means. On the other hand, when the distance sensor means moves out of the space, the second carrier sensor detects the other of the two carriers and generates a second high-level voltage signal to the gate circuit whereby the gate circuit is closed upon rising of the second voltage signal, thus interrupting the supply of the digital voltage signal to the arithmetic operation means.

In another form of the invention, the gate circuit comprises:
a flip-flop circuit having a first input terminal to which a predetermined high-level voltage signal, a second input signal to which the first voltage signal is input, and a third input terminal to which the second voltage signal is input; and
AND circuit means having a first input terminal connected to an output terminal of the flip-flop circuit and a second input terminal connected to an output terminal of the analog/digital conversion means.

With the above arrangement, the first voltage signal is input to the second input terminal of the flip-flop circuit, the constant high-level voltage input from the first input terminal thereof is output from the output terminal thereof to the first input terminal of the AND circuit means, whereby the digital voltage signal from the analog/digital conversion means is input to the arithmetic operation means. When the second voltage signal is input to the third input terminal of the flip-flop circuit, the supply of the constant voltage from the first input terminal thereof to the AND circuit means is interrupted so that the digital voltage signal is not input to the arithmetic operation means.

In a further form of the invention, the flip-flop circuit comprises a D-type flip-flop circuit having the first input terminal in the form of a data terminal, the second input terminal in the form of a clock terminal, and the third input terminal in the form of a reset terminal.

In a further form of the invention, the D-type flip-flop circuit generates an n-bit digital voltage signal in n-bit parallel form, and the AND circuit means comprises a plurality of AND circuits to which n bits of the digital voltage signal are respectively input in a parallel manner from the D-type flip-flop circuit.

In a further form of the invention, the distance sensor comprises an eddy current sensor.

With the above arrangement, the distance to the other surface plate is detected by the magnetic field radiated from the eddy current sensor to the other surface plate, and an analog voltage signal representative of the detected distance value is output from the eddy current sensor.

In a further form of the invention, the distance sensor means is embedded in the one surface plate and has a tip end thereof disposed inside the one surface plate.

The above and other objects, features and advantages of the present invention will become more readily apparent to those skilled in the art from the following detailed description of the invention when taken in conjunction with the accompanying drawings.

DESCRIPTION OF THE PREFERRED EMBODIMENT

Now, a preferred embodiment of the present invention will be described in detail while referring to the accompanying drawings.

Figure 1:
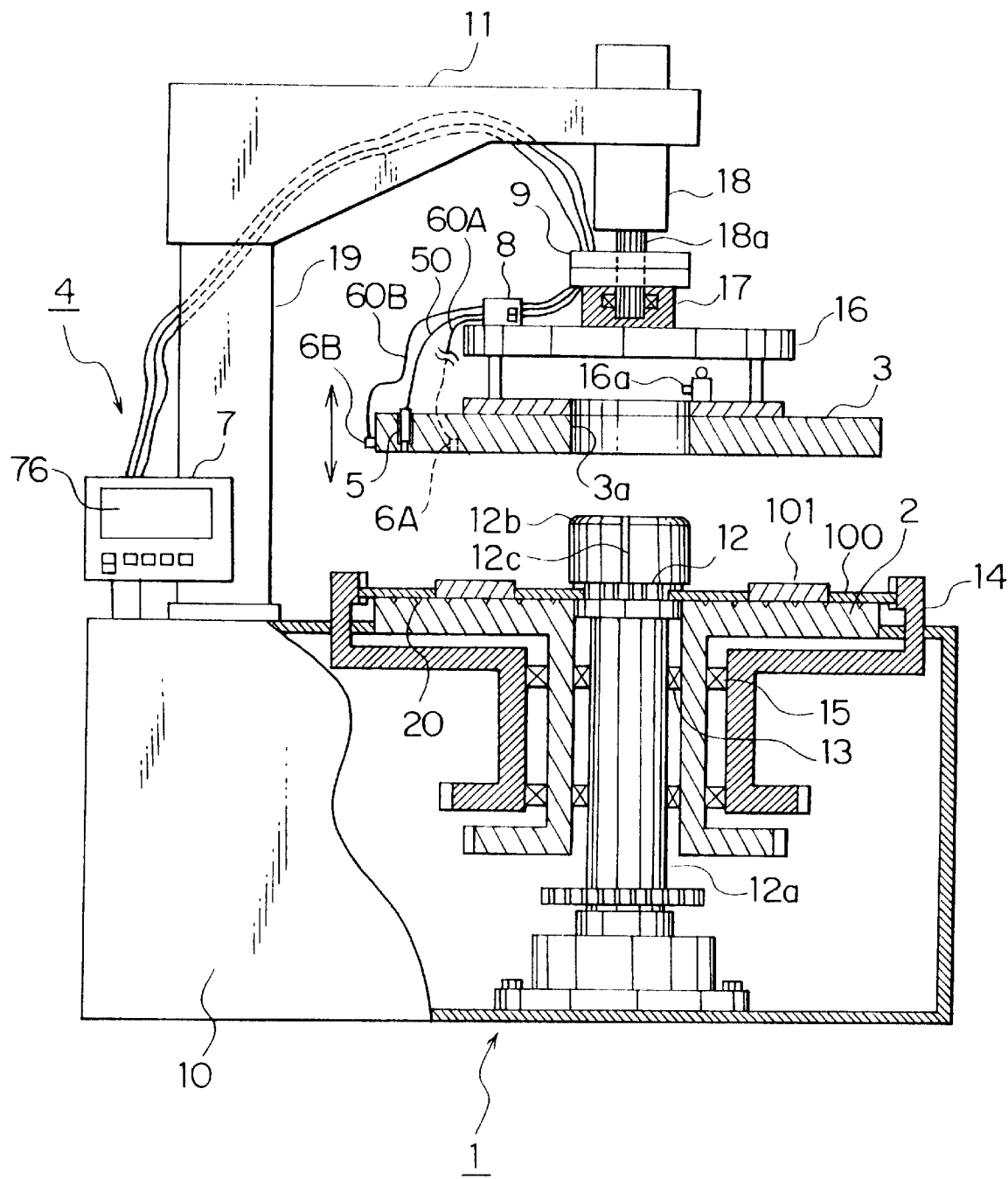
FIG. 1 is a partially cut-away front elevational view showing a lapping apparatus equipped with an automatic measuring apparatus in accordance with the present invention.
Figure 7:
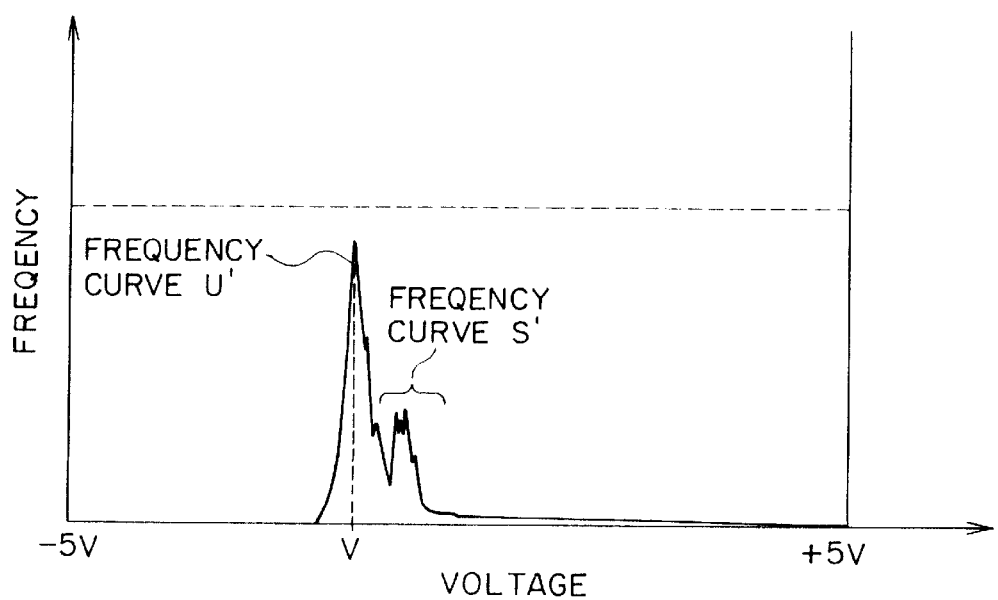
FIG. 7 is a view showing a frequency distribution of digital voltage signals according to the present invention.
Figure 8:
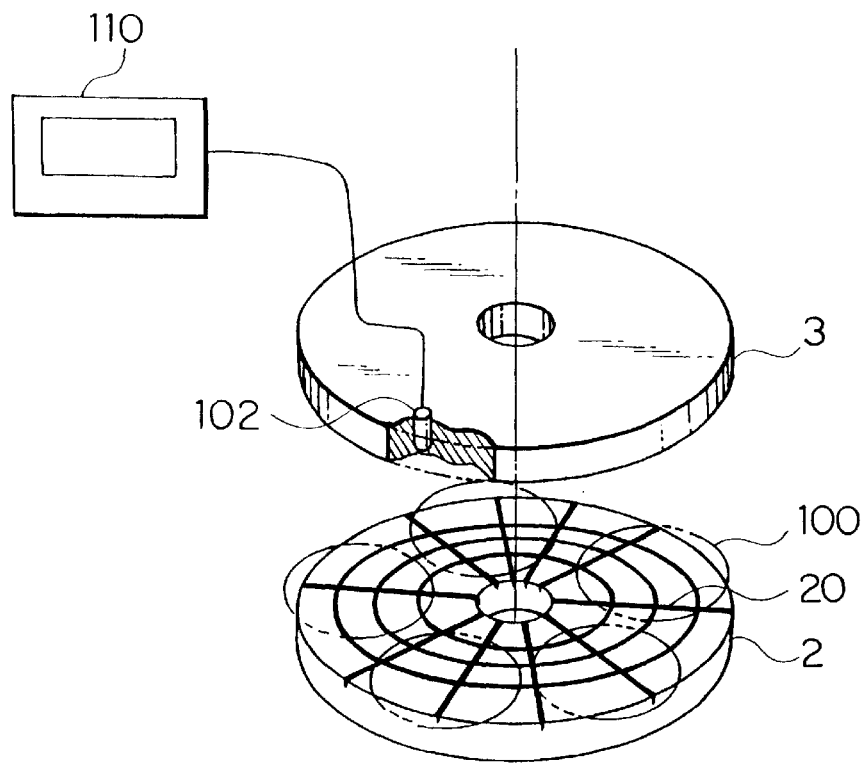
FIG. 8 is a schematic view showing a conventional automatic measuring apparatus.
Figure 9:
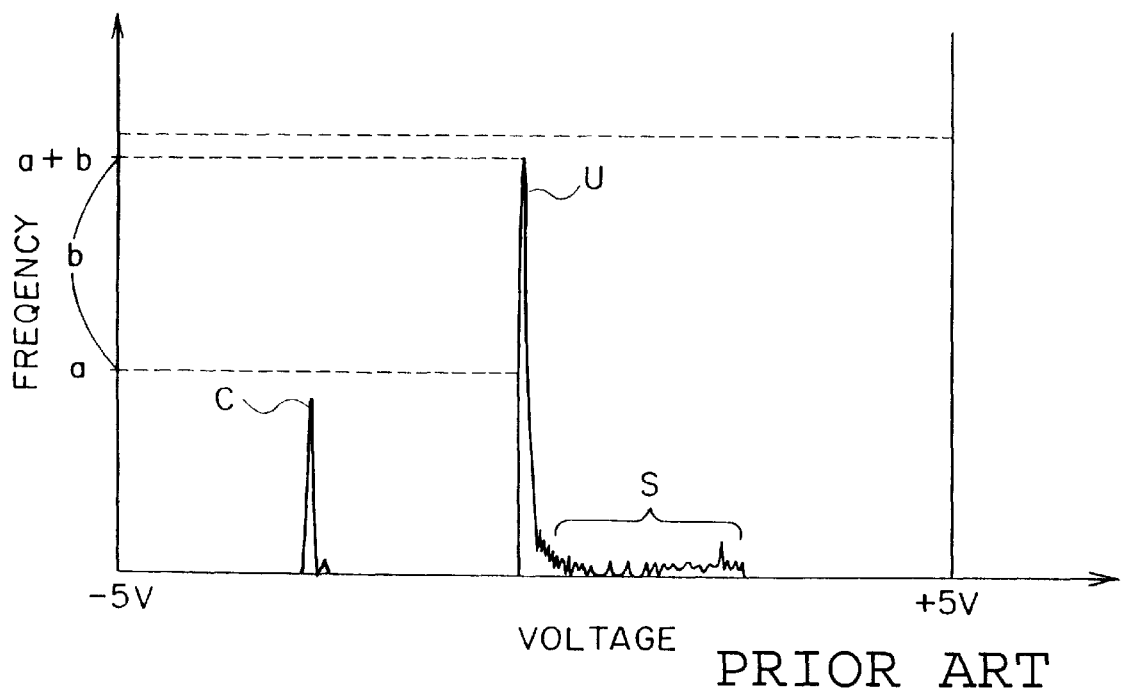
FIG. 9 is a view showing a frequency distribution of digital voltage signals generated by the conventional automatic measuring apparatus of FIG. 8.

FIG. 1 shows in a partially broken form a lapping apparatus equipped with an automatic measuring apparatus constructed in accordance with the principles of the present invention. In the following description, the same symbols as those employed in FIGS. 7 and 8 designate the same or corresponding elements therein.

In FIG. 1, a reference numeral 1 designates a lapping apparatus, and a reference numeral 4 designates an automatic measuring apparatus.

The lapping apparatus 1 comprises a lower surface plate 2 disposed at an upper portion within a lower housing 10, and an upper surface plate 3 suspended from an arm 11.

The lower surface plate 2 is in the form of a circular disk-shaped member on which a plurality of carriers 100 each holding a work piece 101 are mounted. The lower surface plate 2 is provided on its upper surface with a plurality of cross grains 20 extending radially from a central bore toward the peripheral edge thereof for sweeping a polishing agent in the form of slurry on the upper surface thereof.

The lower surface plate 2 is rotatably mounted through a pair of bearings 13 on a drive shaft 12a having a sun gear 12 fixedly attached thereto near a top end thereof. Also, an internal gear 14 is rotatably mounted through a pair of bearings 15 on an outer periphery of the lower surface plate 2.

The upper surface plate 3 is in the form of a circular disk-shaped member which is supported by a support ring 16 so as to be rotatable while pushing work pieces 101 held by the carriers 100 toward the upper surface of the lower surface plate 2. Specifically, fixedly attached to the upper surface of the support ring 16 supporting the upper surface plate 3 is a bearing member 17 into which a rod 18a of a cylinder 18 is inserted, the cylinder 18 being in turn supported by an arm 11 of a support pole 19.

Figure 3:
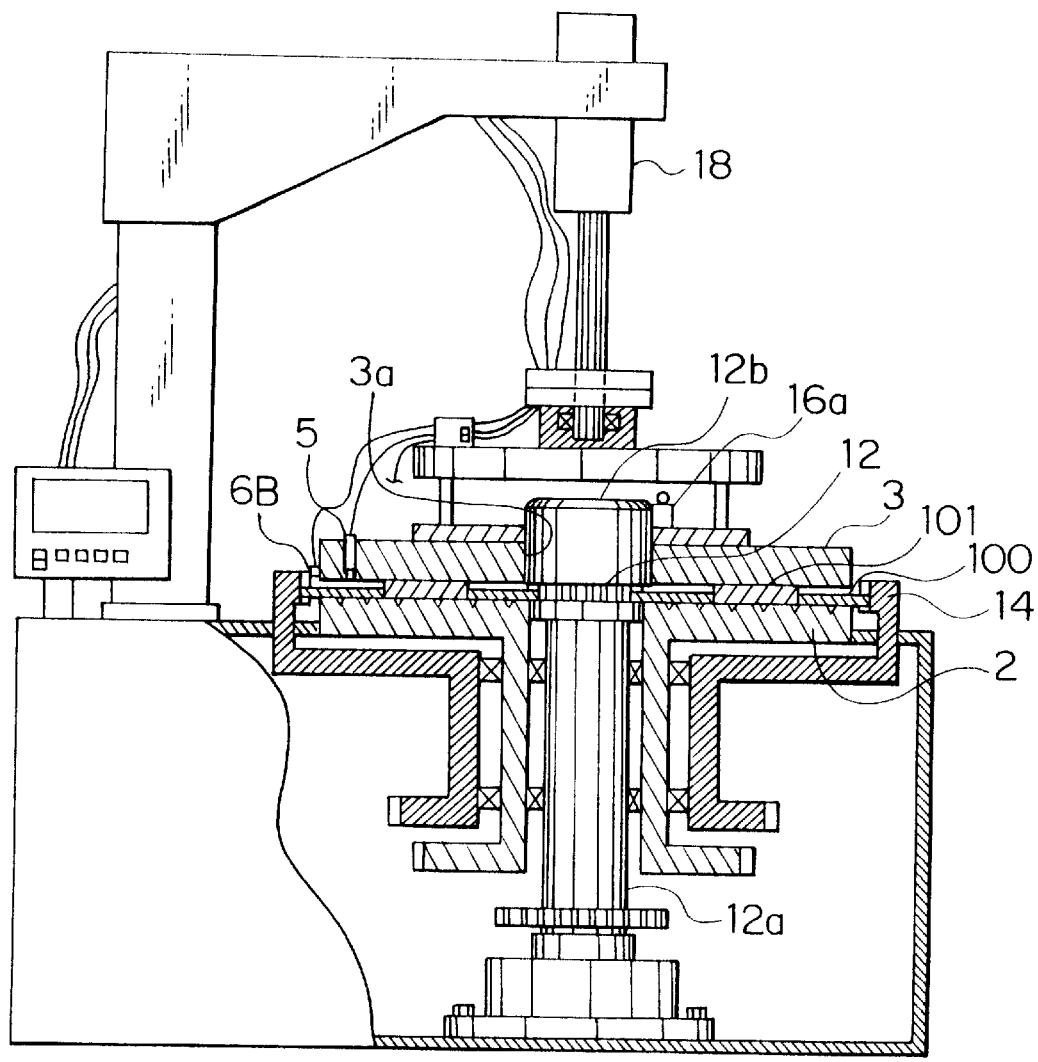
FIG. 3 is a partially cut-away front elevational view showing a polishing operation of the lapping apparatus of FIG. 1.

With this construction, as shown in FIG. 3, the carriers 100 each holding a work piece 101 is placed into engagement with the sun gear 12 and the internal gear 14 and disposed together with them on the lower surface plate 2. In this state, the upper surface plate 3 is driven to move in a downward direction under the action of the cylinder 18 through the intermediary of the rod 18a so that the a driver 12b, which is provided at the top of the drive shaft 12 and has a plurality of vertical flutes or grooves 12c formed on the outer peripheral surface thereof, pass the central bore 3a in the upper surface plate 3. As a result, the vertical grooves or flutes 12c on the outer peripheral surface of the driver 12b are made into fitting engagement with a driver hook 16a fixedly mounted on the upper surface plate 3.

In this state, the drive shaft 12a is driven to rotate under the action of an unillustrated motor associated therewith, whereby the sun gear 12 and the upper surface plate 3 are caused to rotate in the same direction. Simultaneous with this, the lower surface plate 2 and the internal gear 14 are driven to rotate in the direction opposite that of the sun gear 12 by means of an unillustrated motor, so that the carriers 100 revolve around the sun gear 12 while rotating about their own axis, as a result of which the work pieces 101 held by the carriers 100 are polished by means of the lower surface plate 2 and the upper surface plate 3 which are rotating in the opposite directions with respect to each other.

On the other hand, as shown in FIG. 1, the automatic measuring apparatus 4 is provided with a distance sensor in the form of an eddy current sensor 5 embedded in the upper surface plate 3 for measuring the distance between the confronting surfaces of the upper and lower surface plates 3, 2, a first carrier sensor in the form of a first sensor 6A, and a second carrier sensor in the form of a second sensor 6B, and an apparatus proper 7.

The eddy current sensor 5 is embedded in the peripheral portion of the upper surface plate 3 as shown in FIG. 1. Specifically, as clearly seen from FIG. 4, the upper surface plate 3 is provided at the peripheral portion thereof with a stepped bore 30 into which the eddy current sensor 5 is fitted with a tip end thereof being in abutment with a step or shoulder of the stepped bore 30. As a result, the tip end of the eddy current sensor 5 is positioned at a predetermined distance d vertically apart from the lower surface 3b of the upper surface plate 3. This arrangement serves to prevent the tip end of the eddy current sensor 5 from being damaged due to wearing of the lower surface 3b of the upper surface plate 3.

The eddy current sensor 5 is a well-known type sensor which generates an analog voltage signal A representative of a distance L to the lower surface plate 2. The eddy current sensor 5 generates a magnetic field directed to the lower surface plate 2 so as to create an eddy current in the lower surface plate 2. As the eddy current sensor 5 approaches the lower surface plate 2, the greater the magnitude of the eddy current thus created grows, so that the inductance of the coil of the eddy current sensor 5 increases. Thus, the shorter the distance L between the eddy current sensor 5 and the lower surface plate 2, the greater the analog voltage signal A becomes, whereas the longer the distance L, the lesser the analog voltage signal A becomes. In this embodiment, when the distance L is zero, the eddy current sensor 5 outputs a "-5 V" analog voltage signal A, and it can generate a +5 V analog voltage signal at the maximum.

Figure 2:
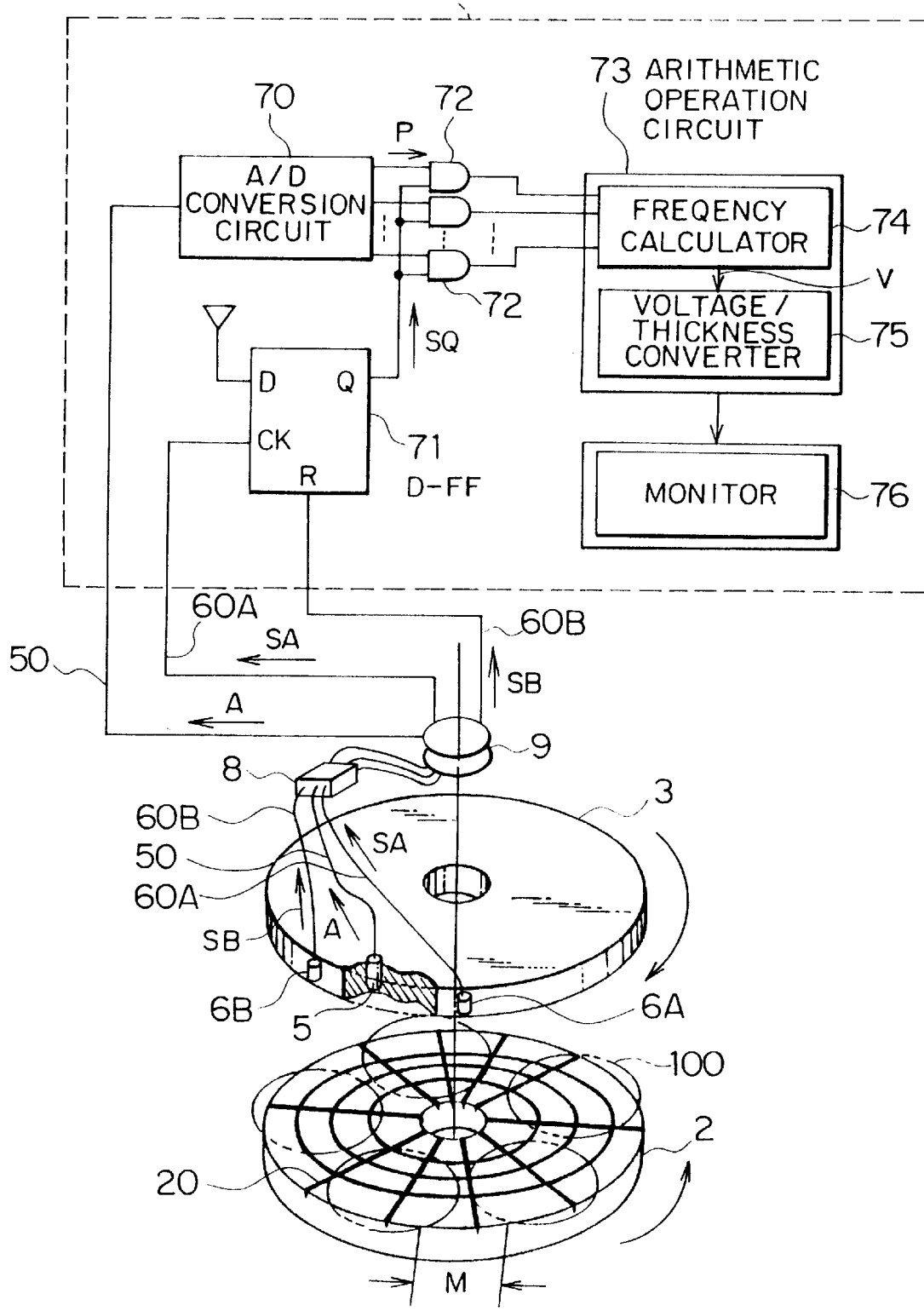
FIG. 2 is a block diagram of the automatic measuring apparatus of FIG. 1.
Figure 5A:
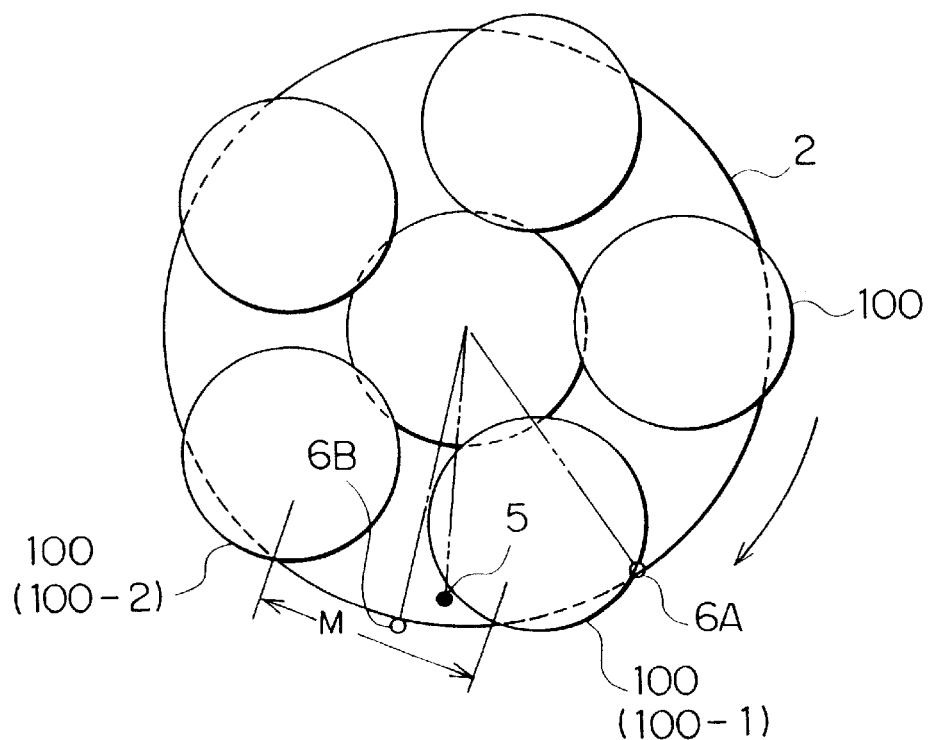
FIG. 5(a) is a plan view schematically showing an operational position of a first sensor 6A of FIG. 2.
Figure 5B:
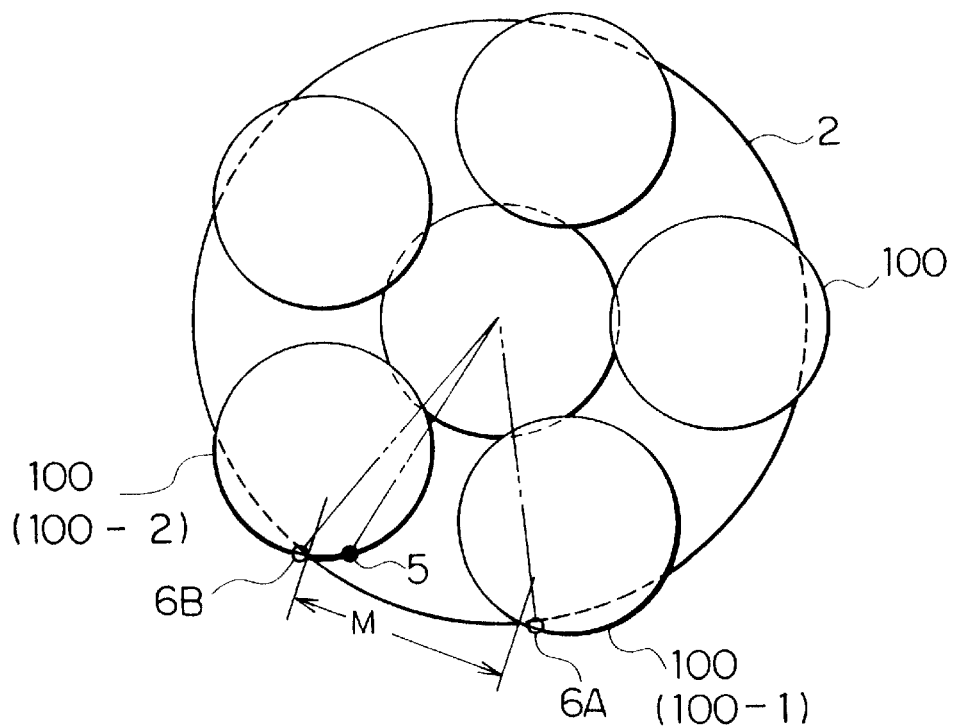
FIG. 5(b) is a plan view schematically showing an operational position of a second sensor 6B of FIG. 2.

As illustrated in FIG. 2, the sensor 6A, 6B are mounted on the outer peripheral surface of the upper surface plate 3 with the eddy current sensor 5 being interposed therebetween, so that they can detect a carrier 100 and generate a first high-level voltage signal SA and a second high-level voltage signal SB, respectively. Specifically, the first and second sensors 6A, 6B are disposed on the outer peripheral surface of the upper surface plate 3 in such a manner that when the eddy current sensor 5 is positioned at the right-hand end of a space M between two adjacent carriers 100 (100-1, 100-2), as shown in FIG. 5(a), the first sensor 6A is positioned at the right-hand edge of the right-side carrier 100-1, whereas when the eddy current sensor 5 is positioned at the left-hand end of the space M, the second sensor 6B is positioned at the right-hand edge of the left-side carrier 100-2, as shown in FIG. 5(b).

As illustrated in FIG. 2, output wire or lines 60A, 60B of the first and second sensors 6A, 6B and an output wire or line 50 of the eddy current sensor 5 are connected to the apparatus proper 7 through an amplifier 8 and a rotary connector 9.

The apparatus proper 7 serves to calculate a distance L' (see FIG. 4) between the lower surface plate 2 and the upper surface plate 3 based on the analog voltage signal A from the eddy current sensor 5, and it comprises an analog/digital (A/D) conversion means in the form of an A/D conversion circuit 70, a gate circuit comprising a D-flip-flop (D-FF) circuit 71, and a plurality of (n in the illustrated embodiment) AND circuits 72, an arithmetic operation means in the form of an arithmetic operation circuit 73, and a monitor 6.

The A/D conversion circuit 70 samples the analog signal A from the eddy current sensor 5 at a sampling frequency in the rang of from 3 to 5 KHz to successively convert it into a corresponding n-bit digital signal P. The A/D conversion circuit 70 successively outputs each of the digital voltage signals P thus converted in n-bit parallel form so as to expedite the following processing.

The gate circuit comprising the D-FF circuit 71 and the AND circuits 72 is provided at an output stage of the A/D conversion circuit 70 for opening it upon a rise of the first voltage signal SA and closing it upon a rise of the second voltage signal SB. Specifically, the D-FF circuit 71 has a first input terminal in the form of a data terminal D connected to a constant voltage supply of a high level, a second input terminal in the form of a clock terminal CK and a third input terminal in the form of a reset terminal R connected to the output lines 60A, 60B, respectively, and an output terminal Q connected to a first input terminal of each of the plurality of (n) AND circuits 72. Each of the AND circuits 72 has a second input terminal connected to a corresponding one of the n-bit parallel outputs of the A/D conversion circuit 70. Each of the AND circuits 72 has an output terminal connected to the arithmetic operation circuit 73.

With this arrangement, the respective bits of each digital voltage signal P output from the A/D conversion circuit 70 are input to the corresponding AND circuits 72 where they are logically ANDed with the corresponding outputs SQ from the D-FF circuit 71.

Accordingly, when the outputs SQ of the D-FF circuit 71 are of the high level, the digital voltage signal P of the A/D conversion circuit 70 is output to the arithmetic operation circuit 73 through the AND circuits 72, whereas when the outputs SQ are of the low level, the digital voltage signal P from the A/D conversion circuit 70 is interrupted by the AND circuits 72.

In this manner, the outputs SQ of the D-FF circuit 71 are controlled by the first and second voltage signals SA, SB input to the clock terminal CK and the reset terminal R, respectively, of the D-FF circuit 71.

Figure 6A:
FIG. 6(a) is a timing chart showing a waveform of a voltage signal SA output from the first sensor 6A.
Figure 6B:
FIG. 6(b) is a timing chart showing a waveform of a voltage signal SB output from the second sensor 6B.
Figure 6C:
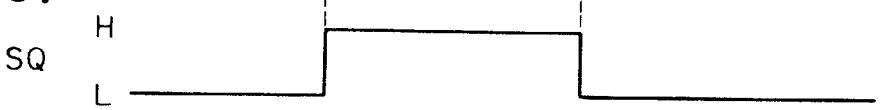
FIG. 6(c) is a timing chart showing a waveform of a voltage signal SQ output from a D-FF circuit 71 of FIG. 2.

More specifically, as shown in FIG. 6(a), the high-level voltage input from the data terminal D of the D-FF circuit 71 upon rising of the first voltage signal SA (indicated by an arrow) is output as the output signal SQ. Also, as shown in FIG. 6(b), when the second voltage signal SB rises, the output signal SQ is reset to the low level. As a result, as shown in FIG. 6(c), the output SQ is at the high level only during the time from the rising of the voltage signal SA to the falling of the voltage signal SB, allowing the digital voltage signal P from the A/D conversion circuit 70 to be input to the arithmetic operation circuit 73.

The arithmetic operation circuit 73 illustrated in FIG. 2 determines a specific digital voltage signal having a maximum number of occurrences or maximum frequency among the respective input digital voltage signals P, and calculates, based on the thus determined maximum-frequency digital voltage signal, the distance L' between the lower and upper surface plates 2, 3.

Specifically, the arithmetic operation circuit 73 comprises a frequency calculator 74 to which the respective digital voltage signals P are input in the parallel form, and a voltage/thickness converter 75 which is to be described later in detail.

The frequency calculator 74 calculates a frequency distribution of the respective input digital voltage signals P with respect to the varying voltage, and outputs the voltage value V of the maximum-frequency digital voltage signal P to the voltage/thickness converter 75.

The voltage/thickness converter 75 calculates the distance L between the eddy current sensor 5 and the lower surface plate 2 (see FIG. 4) based on the voltage value V from the frequency calculator 74, and subtracts the distance d from the distance L to obtain the distance L' between the lower surface plate 2 and the upper surface plate 3, and generates an output signal representative of the distance L' to the monitor 76.

The monitor 76 displays a numerical value representing the distance L' based on the output signal from the voltage/thickness converter 75.

Now, the operation of the automatic measuring apparatus according to this embodiment will be described below in detail.

First, as shown in FIG. 3, the upper surface plate 3 is driven to move in the downward direction, so that the driver 12b at the top end of the drive shaft 12a is inserted into and passed through the central bore 3a in the upper surface plate 3 with the vertical flutes or grooves 12c on the outer peripheral surface of the driver 12b (see FIG. 1) being engaged with the driver hook 16a. In this state, the sun gear 12 and the upper surface plate 3 are driven to rotate in the same direction, and at the same time the lower surface plate 2 and the internal gear 14 are driven to rotate in the direction opposite to the rotational direction of the sun gear 12.

With these rotational motions, the carriers 100 are caused to revolve around the sun gear 12 while rotating about their own axis, whereby the work pieces 101 held by the carriers 100 are polished by means of the lower and upper surface plates 2, 3 which are rotating in the opposite directions with respect to each other.

Each time one of the lower surface plate 2, the cross grains 20 and the carriers 100 and the work pieces 101 of a low resistance passes under the eddy current sensor 5, the eddy current sensor 5 respectively detects it and generates an analog voltage signal A representative of the distance thereto, as seen from FIG. 2.

The analog voltage signal A is amplified by the amplifier 8, and then input to the A/D conversion circuit 70 via the rotary connector 9. The A/D conversion circuit 70 samples the analog voltage signal A at a sampling frequency in the range of from 3 to 5 KHz, and successively outputs n-bit digital voltage signals P.

Figure 4:
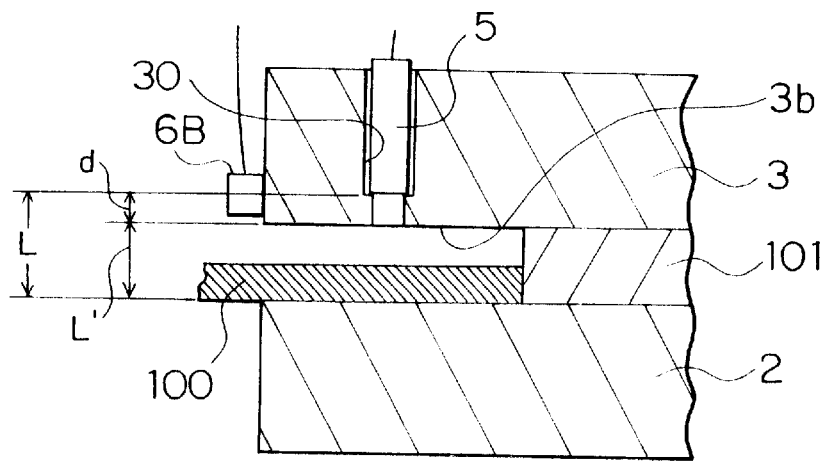
FIG. 4 is a cross section showing a distance between lower and upper surface plates and an eddy current sensor.

Explaining more specifically, as can be seen from FIGS. 2 and 4, the analog voltage signals A having magnitudes respectively corresponding to the distance to the lower surface plate 2, the distance to the cross grains 20, the distance to the carriers 100 and the distance to the work pieces 101 are successively input to the A/D conversion circuit 70 which samples them at the above-mentioned frequency and outputs the n-bit digital voltage signals P.

In parallel with this operation, the first and second sensors 6A, 6B detect the carriers 100 in the following manner.

FIGS. 5(a) and 5(b) illustrates the operations of the first and second sensors 6A, 6B in which the eddy current sensor 5 and the first and second sensors 6A, 6B mounted on the upper surface plate 3 are rotating in a direction indicated by an arrow (i.e., in the clockwise direction) relative the carriers 100.

The eddy current sensor 5 operates to output an analog signal A irrespective of the presence or absence of the carriers 100. When the eddy current sensor 5 reaches the right-hand end of a space M, the first sensor 6A is positioned at the right-hand edge of a carrier 100-1 and detects it to generate a high-level voltage signal SA.

When the eddy current sensor 5 reaches the left-hand end of the space M as the rotation of the upper surface plate 3 relative to the lower surface plate 2 further proceeds, as shown in FIG. 5(b), the second sensor 6B is positioned at the right-hand edge of a carrier 100-2 and detects it to generate a high-level voltage signal SB.

In this manner, the voltage signal SA which rises upon detection of the carrier 100-1, as shown FIG. 6(a), is first input to the clock terminal CK of the D-FF circuit 71 (see FIG. 2), and the voltage signal SB which rises upon detection of the carrier 100-2, as shown in FIG. 6(b), is input to the reset terminal R of the D-FF circuit 71, whereby the D-FF circuit 71 generates to the AND circuits 72 an output signal SQ which is held at the high level during the time from the rising of the voltage signal SA to the rising of the voltage signal SB, as clearly seen from FIG. 6(c).

That is, the output signal SQ input to the AND circuits 72 as shown in FIG. 2 is at the high level only when the eddy current sensor 5 is positioned at the space M, and at the low level at the other time when the eddy current sensor 5 is positioned at a carrier 100 or the work piece 101. As a consequence, only those sampling digital signals P input to the AND circuits 72 from the A/D conversion circuit 70 which represent the distance L to the upper surface of the lower surface plate 2 disposed in the space M or the distance to a cross grain 20 thereon are output from the AND circuits 72.

In this manner, the digital voltage signals P having passed through the AND circuits 72 are input to the frequency calculator 74 where the voltage value of each digital voltage signal P and the number of occurrences or frequency thereof are linked with each other.

At this time, the digital voltage signals P input to the frequency calculator 74 include only the distance data relating to the lower surface plate 74 and the cross grains 20, so the frequency calculator 74 creates a frequency distribution consisting of a frequency curve U' of the digital voltage signal P representative of the distances to the upper surface of the lower surface plate 2 and a frequency curve S' of the digital voltage signal P representative of the distances to the cross grains 20.

From this frequency distribution, it can be clearly seen that there is a distinct difference between the maximum frequency of the frequency curve U' and that of the frequency curve S'. Therefore, in the frequency calculator 74, a voltage value V corresponding to the maximum frequency of the frequency curve U' is taken out, thus representing the distance L from the tip or lower end of the eddy current sensor 5 to the upper surface of the lower surface plate 2.

That voltage value V is output from the frequency calculator 74 to the voltage/thickness converter 75, as shown in FIG. 2, where it is converted into a corresponding distance L from which the constant distance d is subtracted, providing the distance L' between the lower surface plate 2 and the upper surface plate 3.

As is clear from the foregoing, according to the automatic measuring apparatus of this embodiment, the eddy current sensor 5 embedded in the upper surface plate 3 is able to detect the distances to the lower surface plate 2 and the like without being placed in contact therewith, so there will be no measurement error resulting from wearing of the eddy current sensor 5.

Moreover, since the automatic measuring apparatus is constructed such that the distance from the upper surface plate 3 to the lower surface plate 3 between which the work pieces 101 are clampingly held is directly detected in place of an amount of downward displacement of the upper surface plate 3, there will be no error in the measurement of the thickness of each work piece 101 even if the lower surface plate 2 has substantially been worn. In addition, with the lapping apparatus 1, in the case where the upper surface plate 3 is worn, for example, by about 1 $\mu$m in one polishing process, the distance d between the tip end of the eddy current sensor 5 and the lower surface 3a of the upper surface plate 3 after repetitions of N processes decreases by a total length of "N×1" $\mu$m. In this case, the voltage/thickness converter 75 can calculate the distance L' by subtracting a difference between the constant value d and "N×1" $\mu$m from the distance L.

Furthermore, the automatic measuring apparatus of the present invention is constructed such that the digital voltage signals P representative of the distances to the carriers 100 and the distances to the work pieces 101 are all removed so that only the digital voltage signals P for the space M between the carriers 100 are detected. With this construction, it is possible to perform highly accurate measurements of the thickness of each of the work pieces 101 held by the carriers 100 without being affected by the property of the work pieces 101. Thus, the thickness of a work piece 101 having low resistance can be measured with high precision.

In addition, it will be apparent to those skilled in the art that the present invention is not limited to the above-described embodiment but various modifications and/or changes thereof can be made within the scope or sprit of the present invention as defined in the appended claims.

For example, although in the above embodiment, the eddy current sensor 5 is used for the distance sensing means, the invention is not limited to this and a variety of sensors can be employed which are able to detect the distance to the lower surface plate 2 and the like in a non-contact manner without contacting the lower surface plate 2 and the like.

Also, the sampling frequency of the A/D conversion circuit 70 ranging from 3 to 5 KHz is used, but it can be set or selected optionally while taking account of the accuracy of measurements.

Further, although the gate circuit of the switching means comprises the D-FF circuit 71 and the plurality of AND circuits 72, it is not limited to such a construction, but any type of gate circuit can be used for the same purpose which is able to open when the first voltage signal from the first carrier sensor rises and closes when the second voltage signal from the second carrier sensor rises.

As described in detail in the foregoing, according to the automatic measuring apparatus of the present invention, distance sensor means embedded in one of a pair of surface plates is able to detect the distances to the other surface plate by radiating an electromagnetic wave thereto without being placed in contact therewith, so there will be no measurement error resulting from wearing of the eddy current sensor 5.

Moreover, the automatic measuring apparatus of the invention is constructed such that the distance from the one surface plate to the other surface plate between which the work pieces are clampingly held is directly detected in place of an amount of downward displacement of the one surface plate. With this construction, there will be no error in the measurement of the thickness of each work piece even if the other surface plate has substantially been worn.

Furthermore, the automatic measuring apparatus of the present invention is constructed such that the digital voltage signals for the carriers are all removed or excluded so that only the digital voltage signals for the space between the carriers are input to the arithmetic operation means for determining the thickness of each work piece. With this construction, it is possible to perform highly accurate measurements of the thickness of each of the work pieces held by the carriers without being affected by the property of the work pieces Thus, the thickness of a work piece having low resistance can be measured with high precision.

What is claimed is:

1. An automatic measuring apparatus comprising:

distance sensor means mounted on one of a pair of surface plates which are rotatable with respect to each other with a plurality of carriers each holding a work piece being sandwiched therebetween for radiating an electromagnetic wave toward the other surface plate to thereby detect a distance thereto and for generating an analog signal representative of the thus detected distance;

analog/digital conversion means for converting the analog signal from said distance sensor means into a corresponding digital voltage signal at a predetermined sampling frequency;

switching means for allowing the digital voltage signals from said analog/digital conversion means to pass only when said distance sensor means is positioned at a space between said carriers; and arithmetic operation means for determining a thickness of each work piece based on a voltage value of a digital voltage signal having a maximum frequency among said digital voltage signals from said switching means.

2. The automatic measuring apparatus according to claim 1, wherein said switching means comprises:

a first carrier sensor mounted on said one surface plate in which said distance sensor means is mounted for detecting one of two adjacent carriers positioned on the opposite sides of said space to generate a first high-level voltage signal when said distance sensor means is positioned at said space;

a second carrier sensor mounted on said one surface plate in which said distance sensor means is mounted for detecting the other of said two adjacent carriers to generate a second high-level voltage signal when said distance sensor means is positioned out of said space; and a gate circuit connected to an output terminal of said analog/digital conversion means and adapted to open upon rising of said first voltage signal and close upon rising of said second voltage signal.

3. The automatic measuring apparatus according to claim 2, wherein said gate circuit comprises:

a flip-flop circuit having a first input terminal to which a predetermined high-level voltage signal, a second input signal to which said first voltage signal is input, and a third input terminal to which said second voltage signal is input; and AND circuit means having a first input terminal connected to an output terminal of said flip-flop circuit and a second input terminal connected to an output terminal of said analog/digital conversion means.

4. The automatic measuring apparatus according to claim 3, wherein said flip-flop circuit comprises a D-type flip-flop circuit having said first input terminal in the form of a data terminal, said second input terminal in the form of a clock terminal, and said third input terminal in the form of a reset terminal.

5. The automatic measuring apparatus according to claim 4, wherein said D-type flip-flop circuit generates an n-bit digital voltage signal in n-bit parallel form, and said AND circuit means comprises a plurality of AND circuits to which n bits of the digital voltage signal are respectively input in a parallel manner from said D-type flip-flop circuit.

6. The automatic measuring apparatus according to claim 1, wherein said distance sensor comprises an eddy current sensor.

7. The automatic measuring apparatus according to claim 1, wherein said distance sensor means is embedded in said one surface plate and has a tip end thereof disposed inside said one surface plate.

* * * * *